United States Patent [19]

Panoch et al.

[11] Patent Number: 4,566,931

[45] Date of Patent: Jan. 28, 1986

[54] HEAT SEALING TEXTILES WITH COPOLYAMIDES

[75] Inventors: Hans J. Panoch, Haltern; Rainer Feldmann; Hans Hinn, both of Marl; Siegfried Brandt, Haltern; Hans-Jürgen Haage, Herne, all of Fed. Rep. of Germany

[73] Assignee: Chemische Werke Hüls Aktiengesellschaft, Marl, Fed. Rep. of Germany

[21] Appl. No.: 563,563

[22] Filed: Dec. 20, 1983

[30] Foreign Application Priority Data

Dec. 31, 1982 [DE] Fed. Rep. of Germany ....... 3248776

[51] Int. Cl.$^4$ ............................................... C09J 3/14
[52] U.S. Cl. .............................. 156/330.9; 156/331.8; 428/246; 528/310; 528/324
[58] Field of Search ............... 156/330.9, 331.8; 428/246; 528/324, 310

[56] References Cited

U.S. PATENT DOCUMENTS

| | | | |
|---|---|---|---|
| 2,252,555 | 8/1941 | Carothers . | |
| 3,515,702 | 6/1970 | Raabe . | |
| 3,759,877 | 9/1973 | Huhn et al. ........................ | 528/324 |
| 3,839,121 | 10/1974 | Schmitt et al. ...................... | 528/324 |
| 3,850,887 | 11/1974 | Halas et al. ......................... | 528/324 |
| 3,883,485 | 5/1975 | Raabe et al. . | |
| 3,883,487 | 5/1975 | Raabe et al. . | |
| 3,948,844 | 4/1976 | Raabe et al. . | |
| 3,950,297 | 4/1976 | Raabe et al. . | |
| 3,992,360 | 11/1976 | Brinkmann et al. ................ | 528/324 |
| 4,076,881 | 2/1978 | Sato ..................................... | 428/200 |
| 4,141,869 | 2/1979 | Hoss et al. .......................... | 528/324 |
| 4,368,090 | 1/1983 | Mumcu et al. ...................... | 156/283 |

Primary Examiner—John J. Gallagher
Attorney, Agent, or Firm—Wells & Wells

[57] ABSTRACT

Copolyamides based on dicarboxylic acids, diamines and omega amino carboxylic acids or lactams are used as thermoplastic adhesives to heat-seal especially siliconized textiles. The copolymers used consist of 20 to 80% by weight of one or more aliphatic omega amino carboxylic acids or lactams having 6 to 12 carbon atoms in the chain and 80 to 20% by weight of equimolar mixtures of one or more aliphatic dicarboxylic acids having 6 to 12 carbon atoms and aliphatic alpha-omega diamines and possibly cycloaliphatic diamines having 6 to 12 carbon atoms, at least 30% by weight of these diamines consisting of singly branched aliphatic diamines having 6 carbon atoms.

23 Claims, No Drawings

HEAT SEALING TEXTILES WITH COPOLYAMIDES

CROSS-REFERENCE TO RELATED APPLICATIONS

Applicants claim priority under 35 USC 119 for application No. P 32 48 776.2, filed Dec. 31, 1982, in the Patent Office of the Federal Republic of Germany.

The disclosure of copending application Ser. No. 388,427, filed July 14, 1982, and now abandoned is incorporated herein to show the use of a particular mixture of selected copolyamides in the powder form for heat sealing textiles.

BACKGROUND OF THE INVENTION

The field of the invention is polyamide adhesives for textiles and the present invention is particularly concerned with heat sealing textiles with copolyamides.

The state of the art of copolyamides used in the heat sealing of textiles may be ascertained by reference to U.S. Pat. Nos. 2,252,555; 3,515,702; 3,839,121; 3,883,485; 3,883,487; 3,948,844; 3,950,297; and 4,368,090, as well as West German Published Applications Nos. 2,436,430; 2,508,112; 2,642,244; 2,806,933; and 3,005,939, the disclosures of which are incorporated herein by reference.

The use of copolyamides as thermoplastic adhesives has long been known and U.S. Pat. No. 2,252,555 is an illustration of an early use. Lauryllactam based thermoplastic adhesives have been used recently in the technique of heat sealing textiles as disclosed in U.S. Pat. No. 3,515,702. These thermoplastic adhesives sometimes fall short in performance, particularly regarding hot water resistance. They have been modified in many ways to avoid these short falls.

Thus, U.S. Pat. No. 3,839,121 discloses thermoplastic adhesives based on copolyamides appropriately containing branched chain diamine components which give improved resistance to washing solutions. West German Application No. 3,005,939 also discloses copolyamides containing singly branched $C_{10}$-diamines such as 5-methylnonamethylene diamine. These copolyamides are also recommended as textile thermoplastic adhesives. They evince fairly good resistance to hot water but must be fixed at higher temperatures. Nonamethylene diamine based copolyamides also have too high a melting point and, therefore, are unsuitable as thermoplastic adhesives for heat sealing textiles and these copolyamides are disclosed in West German Applications Nos. 2,508,112 and 2,642,244. Copolyamides of low melting points are unsatisfactory with regard to their resistance to hot water and to cleaning and they are disclosed in West German Applications Nos. 2,436,430 and 2,806,993, and U.S. Pat. Nos. 3,883,485; 3,950,297; 3,883,487, and 3,948,844.

In most cases textiles are finished, that is provided with a coating, whereby they get a better feel or are made water-repellent. They are made water-repellent for instance by being siliconized. The thermoplastic adhesives of the prior art are inadequately effective for silicon finished textiles. In other words, the adhesive does not bond silicon finished textiles well enough.

A substantially improved thermoplastic adhesive to bond siliconized fabrics is disclosed in U.S. Application Ser. No. 388,427, filed July 14, 1982, and now abandoned. This thermoplastic adhesive is used in a powder form to heat seal textiles and consists of a mixture of specific proportions of selected copolyamides of higher and lower melting points.

Besides the fact that this thermoplastic adhesive is especially effective only when used in its powder form, it also requires substantial application of specialized apparatus to prepare the mixtures according to the particular formulations. Lastly, these thermoplastic adhesives of the state of the art still require improvement.

SUMMARY OF THE INVENTION

It is therefore an object of the present invention to provide a copolyamide based thermoplastic adhesive which can be used without the addition of a further copolyamide both for normal and also siliconized fabrics. This thermoplastic adhesive bonds especially well for siliconized fabrics and the bond is adequately retained even after several washes and/or chemical dry cleaning, that is, the adhesion after washing or chemical cleaning decreases less than do the thermoplastic adhesives of the state of the art.

Now it has been found that the cited drawbacks of the state of the art are overcome when copolyamides based on dicarboxylic acids, diamines and omega aminocarboxylic acids or lactams are used to heat seal textiles, where the copolyamides comprise:

(A) 20 to 80% by weight of one or more aliphatic omega aminocarboxylic acids or lactams having 6 to 12 carbon atoms in the chain; and (B) 80 to 20% by weight of equimolar mixtures of one or more aliphatic dicarboxylic acids having 6 to 12 carbon atoms with a diamine selected from aliphatic alpha-omega diamines and, optionally, cycloaliphatic diamines having 6 to 12 carbon atoms, where at least 30% by weight of these diamines consist of singly branched aliphatic diamines having 6 carbon atoms.

Advantageously the proportion of component (A) is 30 to 75% by weight, especially 40 to 75% by weight, and of component (B) is 70 to 25, especially 60 to 25% by weight.

DESCRIPTION OF THE PREFERRED EMBODIMENTS

Advantageously component (A) consists of at least two different omega aminocarboxylic acids or lactams. From 30 to 70% of the lactams or omega aminocarboxylic acids have 6 to 8 carbon atoms and 70 to 30% have 9 to 12 carbon atoms.

According to the above definition, the basic ingredients of component (A) contain the grouping

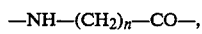

$$-NH-(CH_2)_n-CO-,$$

where n is an integer from 5 to 11. Suitable monomers, therefore, are caprolactam (n=5), enanthlactam, capryllactam, suberolactam, aminoundecanoic acid, lauryllactam or the particular omega aminocarboxylic acid of their lactams.

Aliphatic dicarboxylic acids of component (B) are those having the formula

$$-CO-(CH_2)_x-CO,$$

where x is an integer from 4 to 11, for instance adipic acid, azelaic acid, sebacic acid, suberic acid, nonane dicarboxylic acid and decane dicarboxylic acid.

Suitable alpha omega diamines for instance are hexamethylene diamine, dodecamethylene diamine, decamethylene diamine, nonamethylene diamine, 2,4,4- &

2,2,4-trimethylhexamethylene diamine, and mixtures thereof and, illustratively, the cycloaliphatic diamines such as isophorone diamine.

The proportion of cycloaliphatic diamines to the total portion of diamines is from 0 to 20% by weight and advantageously these cycloaliphatic diamines are not used.

The singly branched aliphatic diamines having 6 carbon atoms are contained in amounts of at least 30, especially at least 50% by weight of the total diamine portion.

A suitable diamine of this type is especially 2-methylpentamethylene diamine. Other examples of suitable singly branched aliphatic diamines include 2-ethyltetramethylene diamine.

Advantageously an isomeric mixture is used consisting of 80 to 100% by weight of 2-methylpentamethylene diamine and from 0 to 20% by weight of 2-ethyltetramethylene diamine.

Such a mixture can be acquired as the commercial product Diamine 51 and is obtained for instance by hydrogenating those by-products accumulating in the production of adiponitrile from hydrocyanic acid and butadiene.

The copolyamides are prepared by the prior art methods of hydrolytic polycondensation at temperatures between 200° and 300° C. and water vapor pressures of 10 to 20 bars in an agitated autoclave. The conventional H-acidic catalysts and possibly other additives such as heat and light stabilizers, fluorescence indicators and the like can be added. The adjustment of the molecular weight takes place, as known in the prior art, by the controlled addition of monofunctional amines or carboxylic acids or by the controlled excess addition of diamines or dicarboxylic acids.

The copolyamide melts are conventionally discharged from the autoclave in string form, cooled with water, granulated and dried. When used as textile adhesives in powder form, liquid $N_2$ is used for fine grinding and sorting of the particular grain fraction for a given application. The sorting is suitably carried out using screens.

The determination of the specific viscosity $\eta_{rel}$ is performed using 0.5% solutions of the copolyamides in distilled m-cresol at 25° C. The melting behavior, that is the flow point of the copolyamide powder, is determined by the thermo analytical apparatus FP 51 (Mettler Co.). The content in extractable portions in the copolyamide is ascertained by extracting 10 g of granulate in 150 ml of methylene chloride at boiling temperatures, for example in a 300 ml Erlenmeier flask with reflux and magnetic stirrer and by weighing the extract.

The copolyamides of the present invention have a specific viscosity $\eta_{rel}$ of about 1.3 to 1.6 and flow points of about 85° C. to 140° C. The extractable content is about 0.5% to 5%.

A grain fraction of 80 to 200 microns is used in each instance to test the application properties. The powder is deposited by means of a Saladin apparatus on an unfinished, roughened, desized cotton interlining at a specific deposition weight (AG), as indicated in the following Table, and is bonded on a surface of 5×20 cm with either a normal twill woven face fabric (N) (for instance mixed cloths, 55% polyester and 45% cotton) or with siliconized fabrics (S) (65% polyester and 35% cotton) in an ironing press for 15 seconds at a compression of 350 pounds/cm².

These bondings then are tested by tension either in the untreated state or after several washes at 60° C., or after several dry cleanings, for their adhesion.

The results are summarized in Table 1.

The copolyamide based thermoplastic adhesives of the present invention are useful to heat seal textiles in the form of powders, foils, monofilaments, fleece, multifilaments, pastes, melt drops, or melt beads.

SPECIFIC EXAMPLES

Throughout the specific examples and the Table, the following abbreviations are used:
LL=lauryllactam
CL=caprolactam
DDS=dodecanoic diacid
HMD=hexamethylene diamine
MPD=2-methylpentamethylene diamine
DH=DDS/HMD mixture
MNDA=5-methylnonamethylene diamine
DA51=MPD+8% isomeric 2-ethyltetramethylene diamine (ETD)
AzS=azelaic acid
SS=sebacic acid.

EXAMPLE 1

A statistical copolyamide of 40 parts of lauryllactam (LL), 30 parts of caprolactam (CL) and 30 parts of an equimolar mixture of dodecanoic diacid (DDS) and diamine (DA51)=(MPD=2-methylpentamethylene diamine containing about 8% of the isomeric 2-ethyltetramethylene diamine), obtained by hydrolytic polycondensation, is converted by cold milling into a textile bonding powder.

Under the conditions stated in Table 1, an interlining treated as normal (N) and siliconized (S) fabrics, is coated with the copolyamide and tested under the stated conditions.

COMPARISON EXAMPLE 1

The procedure is the same as in Example 1, but with 30 parts of (DH) salt, that is an equimolar mixture of (DDS) and hexamethylene diamine (HMD) being used in lieu of 30 parts of (DDS/DA 51 salt).

The separation resistance of the textile adhesive of the present invention is clearly higher than that of Comparison Example 1. After washing and cleaning, the values for the siliconized fabric do not drop or drop only insignificantly within empirical error.

EXAMPLE 2

A copolyamide of 25 parts of (LL), 25 parts of (CL), 25 parts of (DH) salt and 25 parts of the equimolar mixture of azelaic acid (AzS) and (DA 51) is used. Such a copolyamide melting under 100° C. is typically used to bond light fabrics or leather.

Processing to textile bonding powders and testing of Example 2 is carried out as described in Example 1. The multiple wash, which is irrelevant to those adhesives melting under 100° C., is omitted. The separation strengths for normal and siliconized fabrics are comparatively high and in both cases do not drop, or drop only insignificantly in both instances after three-fold or five-fold dry cleaning.

COMPARISON EXAMPLE 2

For comparison, and as in Example 2, a copolyamide of 30 parts of (LL), 30 parts of (CL) and 20 parts each of the equimolar mixture of sebacic acid (SS) and (HMD) or (AzS) and (HMD) are prepared, that is, without using (DA 51), and tested. The measured values listed in the Table clearly show their lower levels and the drop in separation strengths following dry cleaning with respect to the comparable values in Example 2.

COMPARISON EXAMPLE 3

A copolyamide textile adhesive is prepared as in Example 2 from 25 parts of (LL), 25 parts of (CL), 25 parts of (DH salt) and 25 parts of the equimolar mixture of AzS and 5-methylnonamethylene diamine (MNDA) corresponding to Example 1 of West German Application No. 3,005,939, and then tested. In the tested range of the flow point, the described resistance of the thermoplastic adhesive containing (MNDA) no longer is obtained and the test result agrees with that from Comparison test 2, that is, the separation strengths are clearly lower than in Example 2, and there is a clear drop in the separation strengths following dry cleaning.

(B) 80 to 20% by weight of equimolar amounts of:
  (a) aliphatic dicarboxylic acids having 6 to 12 carbon atoms; with
  (b) aliphatic alpha-omega diamines having 6 to 12 carbon atoms wherein at least 30% by weight of said diamines consist of singly branched aliphatic diamines having 6 carbon atoms.

2. The method of claim 1, wherein said textile substrate and said textile upper fabric are siliconized textiles.

3. The method of claim 1, further comprising the addition of not more than about 20% by weight of cycloaliphatic diamines having 6 to 12 carbon atoms as said diamines.

4. The method of claim 3, wherein said singly branched diamines include 2-methylpentamethylene diamine.

5. The method of claim 3, wherein said singly branched diamines include an isomeric mixture of 2-methylpentamethylene diamine and not more than about 20% by weight of 2-ethyltetramethylene diamine.

| | | Separation Strengths (N/5 cm) of Copolyamide Texile Bonds | | | | | | | | | | | | | |
|---|---|---|---|---|---|---|---|---|---|---|---|---|---|---|---|
| Example No. | | 1 | | | 2 | | | Comparison Example 1 | | | Comparison Example 2 | | | Comparison Example 3 | |
| Formulation | | | | | | | | | | | | | | | |
| LL | | 40 | | | 25 | | | 40 | | | 30 | | | 25 | |
| CL | | 30 | | | 25 | | | 30 | | | 30 | | | 25 | |
| DDS/DA 51 (% by weight) | | 30 | | | | | | | | | | | | | |
| AzS/DA 51 | | | | | 25 | | | | | | | | | | |
| DDS/HMD | | | | | 25 | | | 30 | | | | | | 25 | |
| SS/HMD | | | | | | | | | | | 20 | | | | |
| AzS/HMD | | | | | | | | | | | 20 | | | | |
| AzS/MNDA | | | | | | | | | | | | | | 25 | |
| ηrel | | 1.47 | | | 1.38 | | | 1.5 | | | 1.38 | | | 1.43 | |
| extract (CH2Cl2) | | 3.7% | | | 3.1% | | | 2.9% | | | 3.6% | | | 3.3% | |
| FP 51: flow point (°C.) | | 110° | | | 92° | | | 117° | | | 95° | | | 93° | |
| Specific Deposition Weight (g/m²) | | 21 | | | 19 | | | 21 | | | 16 | | | 17 | |
| temperature setting (°C.) in d iron pressing plates | | 140 | 150 | 160 | 140 | 150 | 160 | 140 | 150 | 160 | 140 | 150 | 160 | 140 | 150 | 160 |
| untreated | N | 18.5 | 24.5 | 29.7 | 14.7 | 15.8 | 14.9 | 9.3 | 11.2 | 12.3 | 16.2 | 18.0 | 16.5 | 15.0 | 18.8 | 19.3 |
| | S | 12.0 | 13.0 | 23.0 | 8.7 | 10.5 | 9.8 | 5.8 | 6.4 | 6.0 | 7.5 | 6.3 | 5.5 | 8.8 | 9.3 | 9.0 |
| washed once 60° C. | N | 15.7 | 15.5 | 25.0 | | | | 6.1 | 7.5 | 7.7 | | | | | | |
| | S | 12.3 | 11.3 | 22.7 | | | | 3.1 | 3.8 | 4.5 | | | | | | |
| washed 3 times 60° C. | N | 15.0 | 14.8 | 25.0 | | | | 5.5 | 6.6 | 8.3 | | | | | | |
| | S | 12.7 | 11.2 | 21.7 | | | | 2.8 | 4.3 | 4.2 | | | | | | |
| dry cleaned 3 times | N | 17.0 | 17.3 | 27.3 | 14.5 | 19.5 | 14.8 | 6.0 | 7.8 | 7.7 | 13.3 | 14.0 | 18.5 | 10.2 | 14.8 | 15.3 |
| | S | 14.0 | 12.5 | 24.2 | 8.2 | 11.0 | 9.5 | 3.7 | 3.8 | 5.0 | 4.7 | 6.8 | 7.8 | 5.8 | 6.2 | 6.8 |
| dry cleaned 5 times | N | 18.3 | 18.2 | 26.2 | 13.3 | 14.8 | 10.8 | 6.5 | 7.3 | 8.3 | 11.8 | 12.8 | 14.3 | 11.3 | 14.5 | 15.0 |
| | S | 13.0 | 13.3 | 24.5 | 8.0 | 9.8 | 9.3 | 3.0 | 3.6 | 4.4 | 2.5 | 5.2 | 4.5 | 4.0 | 4.8 | 4.8 |

What we claim is:

1. In the method for heat sealing textiles comprising applying a heat sealable adhesive to one side of a textile substrate; and securing said textile substrate to a textile upper fabric with heat and pressure applied to said heat sealable adhesive, the improvement comprising said heat sealable adhesive having a specific viscosity of about 1.3 to 1.6 and flow points of about 85° C. to 140° C. and consisting essentially of copolyamides produced from:
(A) 20 to 80% by weight of compounds selected from the group consisting of aliphatic omega amino carboxylic acids having 6 to 12 carbon atoms, lactams having 6 to 12 carbon atoms, and mixtures thereof; and 6. The method of claim 1, wherein said singly branched aliphatic diamines are at least 50% by weight of said diamines.

7. The method of claim 1, wherein component (A) contains a plurality of said aliphatic omega amino carboxylic acids.

8. The method of claim 1, wherein component (A) contains a plurality of said lactams.

9. The method of claim 1, wherein said heat sealable adhesive has an extractable content of about 0.5 to 5%.

10. Thermoplastic adhesives having a specific viscosity of about 1.3 to 1.6 and flow points of about 85° C. to 140° C. for heat sealing textiles consisting essentially of copolyamides produced from:

(A) 20 to 80% by weight of compounds selected from the group consisting of aliphatic omega-amino carboxylic acids having 6 to 12 carbon atoms, lactams having 6 to 12 carbon atoms, and mixtures thereof; and
(B) 80 to 20% by weight of equimolar amounts of:
  (a) aliphatic dicarboxylic acids having 6 to 12 carbon atoms; with
  (b) aliphatic alpha-omega diamines having 6 to 12 carbon atoms wherein at least 30% by weight of said diamines consist of singly branched aliphatic diamines having 6 carbon atoms.

11. The thermoplastic adhesives of claim 10, further comprising the addition of not more than 20% by weight of cycloaliphatic diamines having 6 to 12 carbon atoms as said diamines.

12. The thermoplastic adhesives of claim 11, wherein said singly branched diamines include 2-methylpentamethylene diamine.

13. The thermoplastic adhesives of claim 11, wherein said singly branched diamines include an isomeric mixture of 2-methylpentamethylene diamine and not more than about 20% by weight of 2-ethyltetramethylene diamine.

14. The thermoplastic adhesives of claim 10, wherein said singly branched aliphatic diamines are at least 50% by weight of said diamines.

15. The thermoplastic adhesives of claim 10, wherein component (A) contains a plurality of said aliphatic omega amino carboxylic acids.

16. The thermoplastic adhesives of claim 10, wherein component (A) contains a plurality of said lactams.

17. The thermoplastic adhesives of claim 1, having an extractable content of about 0.5 to 5%.

18. Thermoplastic adhesives having a specific viscosity of about 1.3 to 1.6 and flow points of about 85° C. to 140° C. for heat sealing textiles consisting essentially of copolyamides produced from:
(A) 20 to 80% by weight of compounds selected from the group consisting of aliphatic omega amino carboxylic acids having 6 to 12 carbon atoms, lactams having 6 to 12 carbon atoms, and mixtures thereof; and
(B) 80 to 20% by weight of equimolar amounts of:
  (a) aliphatic dicarboxylic acids having 6 to 12 carbon atoms; with
  (b) singly branched aliphatic diamines having 6 carbon atoms.

19. The thermoplastic adhesives of claim 18, wherein said singly branched aliphatic diamine is 2-methylpentamethylene diamine.

20. The thermoplastic adhesives of claim 18, wherein said singly branched diamines include an isomeric mixture of 2-methylpentamethylene diamine and not more than about 20% by weight of 2-ethyltetramethylene diamine.

21. The thermoplastic adhesives of claim 18, wherein component (A) contains a plurality of said aliphatic omega amino carboxylic acids.

22. The thermoplastic adhesives of claim 18, wherein component (A) contains a plurality of said lactams.

23. The thermoplastic adhesives of claim 18, having an extractable content of about 0.5 to 5%.

* * * * *